Sept. 7, 1926.
W. L. BRALEY
1,598,706
SEEDING MACHINE
Filed March 29, 1926
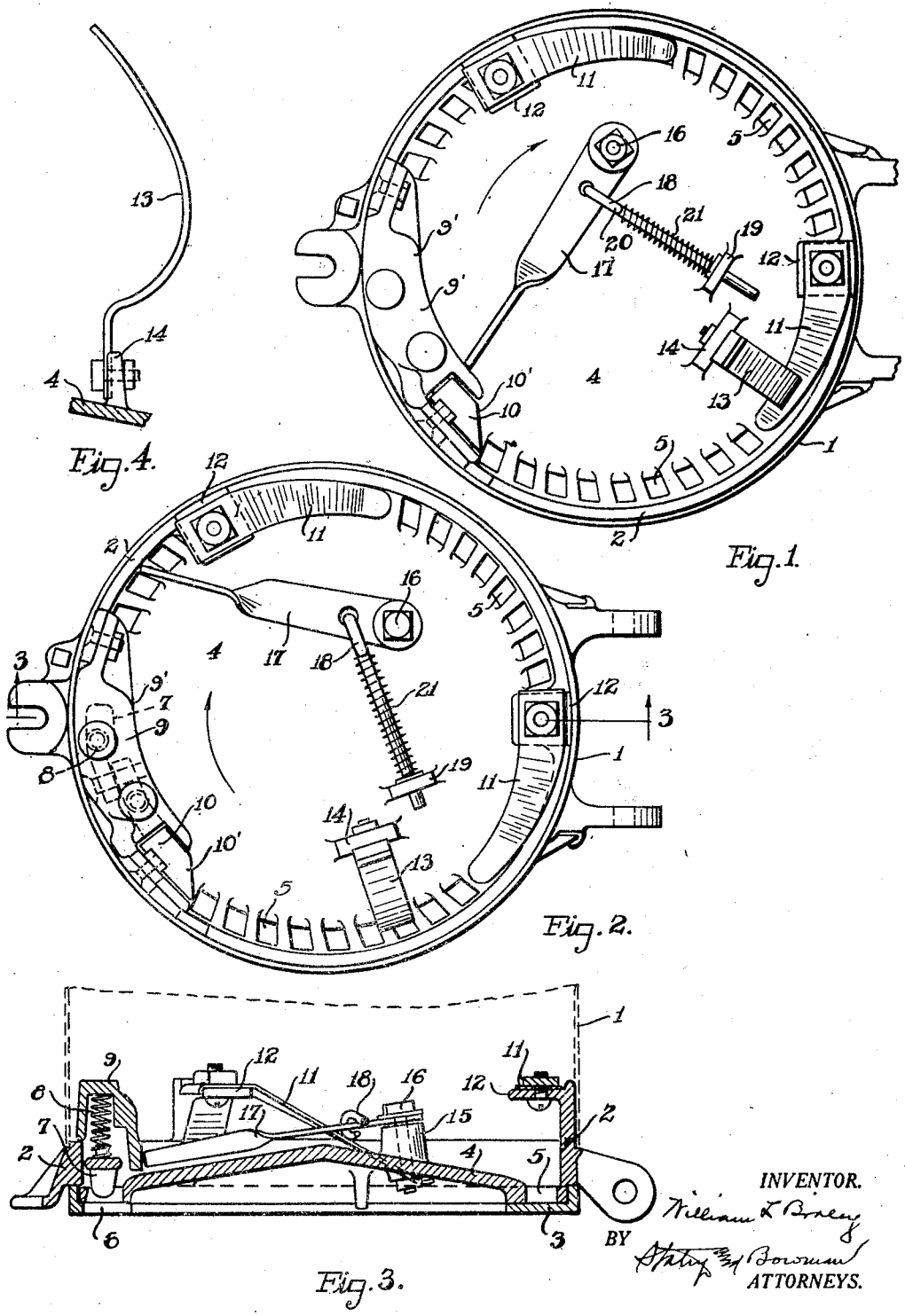

Patented Sept. 7, 1926.

1,598,706

UNITED STATES PATENT OFFICE.

WILLIAM L. BRALEY, OF SPRINGFIELD, OHIO, ASSIGNOR TO THE AMERICAN SEEDING MACHINE COMPANY, OF SPRINGFIELD, OHIO, A CORPORATION OF OHIO.

SEEDING MACHINE.

Application filed March 29, 1926. Serial No. 98,173.

This invention relates to seeding machines, and it more particularly relates to machines for planting cotton seed, or other seeds which have a tendency to bunch or adhere together in the hopper.

The object of my invention is to provide improved means for preventing the seeds from bunching or adhering together in the hopper of the machine and to cause the seeds to be evenly and uniformly deposited in the pockets of the feed wheel.

A further object of the invention is to provide an agitating device of a character which will intermittently impart a beating action to the seeds in the hopper immediately adjacent the rotating feed wheel so as to violently agitate the seeds and thereby separate adhering seeds.

In the accompanying drawing:—

Fig. 1 is a top plan view of the hopper and feeding device in the lower part of the hopper showing my improvements applied thereto.

Fig. 2 is a similar view showing a different position of the agitating device from that shown in Fig. 1.

Fig. 3 is a section on the line 3—3 of Fig. 2.

Fig. 4 is a detail.

Referring to the drawings, 1 represents a cylindrical hopper of the usual form which is supported upon a stationary cylindrical base 2 provided with a stationary floor 3 upon which is rotatably mounted the feed wheel 4. The wheel 4 is provided in the usual way with equally spaced cells 5, the lower ends of which are closed by the floor 3 except at one point where the floor is apertured, as indicated at 6, to permit the discharge of the seeds. The seed is discharged at that point by the action of a knocker 7 normally impelled downwardly by the action of a coil spring 8, the knocker and spring being located in a housing 9, the entrance of which is controlled by a cut-off 10 inclined at the point 10'; this construction being the usual one in machines of this character. Means (not shown) are provided for continuously rotating the feed wheel and the action of the walls of the cells causes the knocker to raise against the tension of the spring 8 as it rides over the walls and to be thereafter impelled downwardly into the pockets to discharge the seeds. A pair of spring fingers 11 are provided for pressing the seeds into the cells, one end of these fingers being attached to inwardly and laterally projecting lugs 12 on the base 2 while the free ends of the fingers bear with a yielding pressure upon the pocketed portion of the feed wheel. A third vertically arranged finger 13 is also provided, this finger being attached to a lug 14 on the feed wheel and projected upwardly into the hopper for agitating purposes.

Pivoted to the upper end of a boss 15 on the upper side of the feed wheel by a bolt 16 is an arm 17 which is formed of stiff sheet metal which is given a quarter turn so that the outer portion of the arm will stand in a vertical direction so as to present a flat face to the direction of rotation of the feed wheel. The boss 15 to which this arm is attached is eccentrically arranged and the length of the arm is such that the free end thereof will bear against the inner surface of the base 2 at all points excepting at the place where the housing 9 is located, at which place the arm will ride upon the inner face of the housing as shown in Fig. 1, leaving the housing at the point 9'. A rod 18 is pivotally connected to the arm 17 near its inner end and is also slidably mounted in a lug 19 projecting upwardly from the feed wheel and there is interposed between a stop 20 on this rod and the lug 19 a coil spring 21.

The operation is as follows: As the feed wheel revolves and the free end of the arm 17 rides upon the inner surface of the housing 9, the arm is swung upon the bolt 16 in the direction opposite to that of the rotation of the feed wheel so that the spring 21 is compressed as indicated in Fig. 1. When the free end of the arm 17 rides off of the housing at the point 9', the action of the spring is to impart to the arm a rapid movement or kick in the direction of the rotation of the feed wheel, the arm being arrested by contacting with the inner surface of the base 2 as indicated in Fig. 2. Such action of the arm is to violently agitate the seeds in the lower part of the hopper, causing any adhering seeds to be separated so as to insure the seeds being properly deposited in the pockets of the feed wheel. As the feed wheel rotates the free end of the arm 17 rides beneath the spring fingers 11, slightly raising these fingers so that when the arm leaves the fingers they will spring downwardly and act to press the seeds into the pockets.

Having thus described my invention, I claim:—

1. In a seeding machine, a base, a feed wheel revolubly mounted on said base, an agitator revoluble with said wheel, and means for imparting a quick movement to said agitator at one point at least in the revolution of said wheel and in the direction of rotation of said wheel.

2. In a seeding machine of the character described, a base, a feed wheel revolubly mounted on said base, an agitator pivotally connected with said wheel and revoluble therewith, and means for imparting a quick movement to said agitator about its pivotal connection with said wheel in the direction of rotation of said wheel at one point at least in the revolution of said wheel.

3. In a seeding machine of the character described, a base, a feed wheel revolubly mounted on said base, an agitator pivotally connected with said wheel, a spring carried by said wheel and exerting a pressure upon said agitator, and means at least one point in the revolution of said wheel for acting upon said agitator to compress said spring and thereafter releasing said agitator whereby a quick movement is imparted thereto by said spring.

4. In a seeding machine of the character described, a base, a feed wheel revolubly mounted on said base, a spring pressed agitator pivoted to said feed wheel and revoluble therewith, and means for swinging said agitator about its pivoted connection to place its spring under increased tension and thereafter releasing said agitator to cause a quick movement to be imparted thereto in the direction of rotation of said feed wheel.

5. In a seeding machine of the character described, a base, a feed wheel revolubly mounted in said base, an agitating arm eccentrically pivoted to said feed wheel and revoluble therewith, a spring carried by said wheel to exert a tension upon said arm, a housing carried by said base and overlying a portion of said feed wheel and standing in the path of movement of the free end of said agitator arm whereby when said arm contacts therewith it is rocked about its pivoted point and its spring placed under increased tension so that upon riding off said housing a quick movement in the direction of rotation of said wheel is imparted to said arm.

6. In a seeding machine, a base, a feed wheel rotatably mounted on said base, an agitator arm eccentrically pivoted to the upper side of said feed wheel, a spring for normally pressing the free end of said arm against the inner wall of said base, and a housing carried by said base overlying a portion of said wheel and standing in the path of the outer end of said arm whereby when said arm rides upon said housing an increased tension is placed upon said spring to impart a quick movement to said arm in the direction of rotation of said wheel when the arm rides off of the housing.

7. In a seeding machine, a base, a feed wheel rotatably mounted on said base, said feed wheel having a plurality of peripheral cells, a spring-pressed finger supported by said base with its free end pressing on the cell portion of said wheel, an agitator arm pivotally connected with said feed wheel together with a spring for forcing the free end of said agitator arm against the wall of said base adjacent the cell portion of said feed wheel, the free end of said agitator arm riding beneath said spring finger as the wheel revolves, and means for rocking said agitator arm upon its pivoted point to place its spring under increased tension at one point in the rotation of said feed wheel.

In testimony whereof, I have hereunto set my hand this 26th day of March, 1926.

WILLIAM L. BRALEY.